Jan. 30, 1945.   A. J. JOHNSON   2,368,595
PROCESS FOR THE SEPARATION OF ACIDIC GASES FROM FLUIDS
Filed Aug. 29, 1941
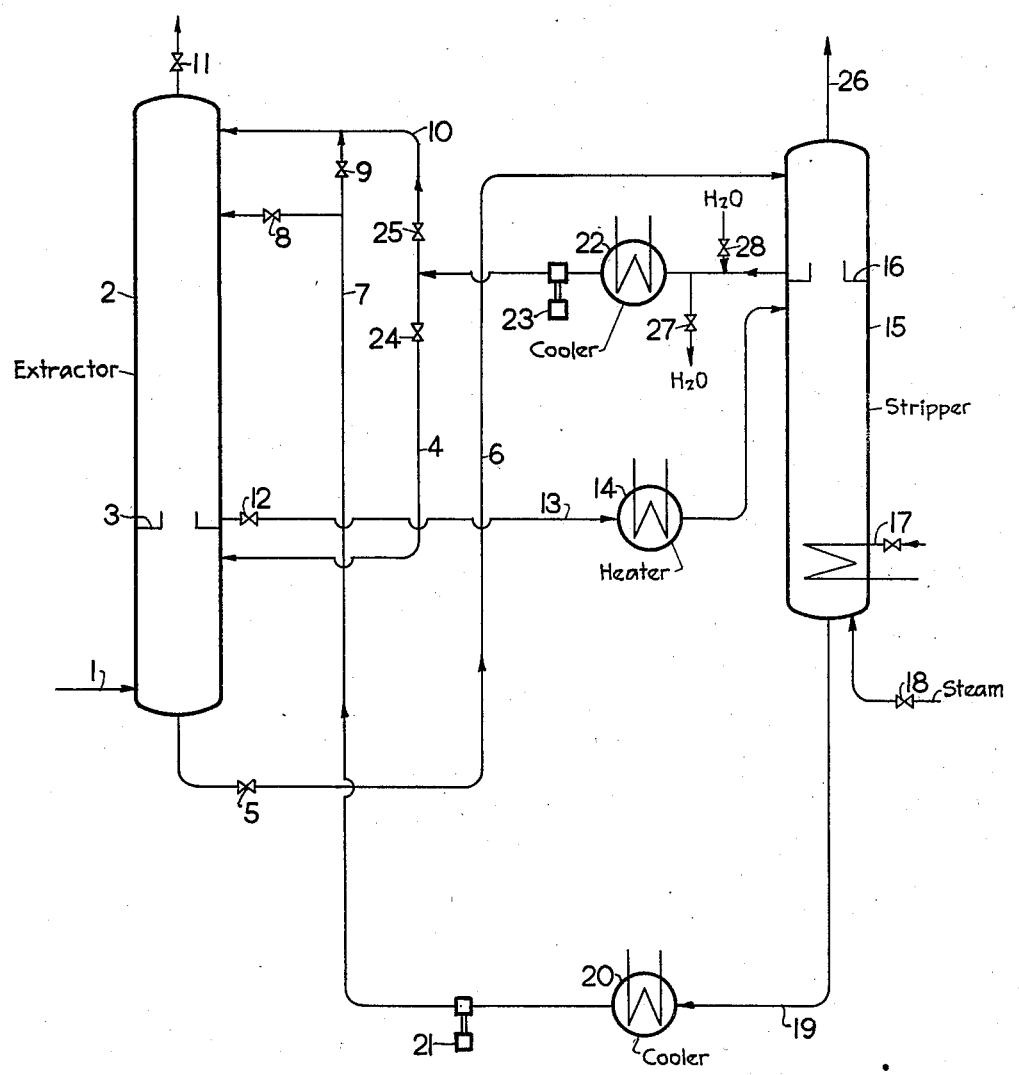
Inventor: Ava J. Johnson
By his Attorney:

Patented Jan. 30, 1945

2,368,595

UNITED STATES PATENT OFFICE 2,368,595

PROCESS FOR THE SEPARATION OF ACIDIC GASES FROM FLUIDS

Ava J. Johnson, Oakland, Calif., assignor to Shell Development Company, San Francisco, Calif., a corporation of Delaware Application August 29, 1941, Serial No. 408,755

7 Claims. (Cl. 23—3)

This invention relates to the purification of substantially water immiscible gases and liquids containing water soluble, vaporizable weakly acidic components such as $H_2S$, $CO_2$, HCN, $SO_2$, methyl mercaptans, etc., and especially deals with the purification of normally gaseous hydrocarbons containing objectionable quantities of $H_2S$.

A number of processes have been proposed and employed for the separation of $H_2S$ and analogous vaporizable weak acids from water immiscible gases or liquids, which processes involve the continuous circulation of an alkaline reacting liquid absorption medium through an absorption stage in which the fluid is scrubbed and $H_2S$ absorbed in the alkaline liquid, and through a reactivation or stripping stage in which the absorbed $H_2S$ is removed, wherein the absorption medium is regenerated and rendered suitable for further scrubbing.

It is a purpose of this invention to provide a novel method for improving the absorption and regeneration efficiencies in processes of the above type. Another purpose is to increase the absorption efficiency so that a high degree of purification of the fluid can be achieved with a minimum expenditure of heat for regeneration of the resulting spent absorption medium.

Fluids treated by processes of the type described comprise natural gas, petroleum refinery gases, coke oven gas, generator gas and other manufactured gases, as well as the gases generated in the various industries such as ore smelting; or air containing weakly acidic gases, especially hydrogen sulfide or $CO_2$; or organic liquids which are substantially immiscible with water as propane, butane, pentane, hexane fractions, benzene, natural gasoline, low boiling gasoline fractions, gasoline distillates, kerosene distillates, normally liquid chlorinated hydrocarbons for instance carbon tetrachloride, ethylene dichloride, etc., fatty and essential oils, and other hydrocarbon and non-hydrocarbon chemically neutral water immiscible fluids.

For the absorption of the weakly acidic components, aqueous solutions of certain organic hydroxy amino bases or salts of inorganic strong bases and relatively weak acids of low volatility are usually employed. A suitable absorption medium absorbs the weak acid from the fluid quickly and completely and is capable of being regenerated by convection activation; i. e., it permits substantial removal of the acid by simple distillation or by a reversal of the absorption reaction, by passing steam therethrough, preferably at an elevated temperature, and at a normal or reduced pressure. Among the absorption media capable of regeneration by convection which have been used in the past for removing $H_2S$, $CO_2$, HCN and the like are aqueous solutions of the following compounds: tripotassium phosphate, sodium or potassium carbonate, sodium phenolate, sodium borate, sodium arsenite, organic water soluble bases such as mono-, di- and triethanol amine or mixtures thereof, diaminoisopropanol, aryl amines such as phenylene diamines, tetra amino naphthalenes, or diamino tetra hydronaphthalene, aryl alkyl amines such as phenyl ethylene diamine or methyl meta phenyl diamine, piperidine or its homologues, piperazine, etc. Mercaptans are generally removed with aqueous solutions of alkali metal hydroxides.

When herein speaking of absorbents I mean alkaline compounds of the above type which are capable of absorbing weak acids and releasing them upon heating under reduced pressure and/or in contact with steam which may be introduced from an outside source. The term "fat solution" as herein used designates an absorbent solution which contains sufficient absorbed weak organic acid so that the solution should be regenerated before it can be used economically for further scrubbing of the fluid; and the term "lean solution" indicates a regenerated solution suitable for further scrubbing.

This invention comprises essentially prescrubbing the fluid containing a weak, water soluble acidic gas, such as $H_2S$, $CO_2$, HCN, etc., with water, preferably under superatmospheric pressure, further scrubbing the resulting water washed fluid with a steam vaporizable absorbent solution, regenerating the resulting fat absorbent solution with steam, and then refluxing the resulting foul steam with the acidulated wash water under conditions to condense steam while allowing passage of the acid gas. Water, as herein described and as is well understood in the art, means pure, distilled, tap, or other water free from substantial amounts of alkaline materials.

My invention can most readily be understood by considering the drawing which represents a flow diagram of one embodiment of my process.

A substantially water-insoluble fluid such as a hydrocarbon gas or liquid containing $H_2S$, $CO_2$, HCN or other analogous, normally gaseous acidic impurity is admitted through line 1 to extraction column 2. The latter is divided into two sections by blank pan 3, each section being provided with contacting means such as bubble trays, packed sections (for example, Raschig rings), etc. In case the fluid is a gas the bubble trays are preferred, while packed sections are preferable when the fluid is a liquid. The fluid enters the lower section near the bottom through line 1 under a pressure preferably between about 200 and 1000 p. s. i., and therein countercurrently contacts water admitted through line 4. Under these high pressures a considerable portion of the acidic impurities is dissolved in the water to form an acidulated water which is withdrawn through pressure release valve 5 and line 6.

The residual washed fluid passes through blank pan 3 into the upper section of extractor 2 wherein it is contacted with an aqueous solution of $K_3PO_4$, a major portion of which is admitted in a relatively concentrated state through line 7 and valve 8, while the remaining portion is diluted by water from lin. 10 and is admitted through line 10 from valve 9. A complete discussion of this split treatment is to be found in U. S. patent to Zublin, 2,157,879. The $K_3PO_4$ solutions herein extract from the fluid a further portion of $H_2S$ and other acidic impurities. The treated fluid passes from the system via line 11. The fat $K_3PO_4$ solution passes from blank pan 3 through a pressure release valve 12, line 13 and heater 14 to stripping column 15. The latter is divided into two sections by blank pan 16 each provided preferably with bubble trays. A valved reboiler 17, as well as valved line 18 for the admission of live steam, is provided at the bottom of column 15.

Stripping column 15 may be operated in two ways. In the first, line 18 is closed and the valve of reboiler 17 is opened so that no steam is blown directly into column 15, all the steam for the stripping being provided by reboiling. Enough heat is supplied by heater 14 and reboiler 17 to reflux the fat solution in the stripping column with steam, and to strip the $H_2S$, etc. from it. The resulting lean solution is withdrawn from the bottom of the column 15 through line 19 and cooler 20. Pump 21 forces the cooled lean solution back through lines 7, 8 and 9 for use in another cycle.

Vapor resulting from the stripping operation and comprising acidic impurities and steam, passes through blank pan 16 to the upper stripper section of column 15 wherein it contacts the acidulated water admitted through line 6. As a result of the contact this water is stripped of $H_2S$, etc. and at the same time steam is condensed. The conditions are preferably so regulated that the condensed water leaves the water stripper at a temperature near its boiling point. Under these conditions the resulting water, which is substantially free from acidic components then passes from blank pan 16 through cooler 22. Pump 23 forces a major part of this water through valve 24 and line 4 back to the lower scrubber section of column 2 for use in another cycle, while a minor part passes through valve 25 and line 10 back to the $K_3PO_4$ upper section of column 2 to dilute a portion of the $K_3PO_4$ solution as explained above. The amount of water used for dilution in line 10 is ordinarily regulated to compensate for that amount of steam which boiled out of the fat solution in the reboiler section of the stripper to maintain proper concentration of the $K_3PO_4$ solution in successive stripping cycles.

Temperature and pressure conditions at the top of stripper 15 are so regulated that the acidic impurities ascending with the stripping steam are not condensed but pass from the system via line 26. A small quantity of water corresponding to its vapor pressure in the gas mixture may escape with the gases, etc., but this loss can be compensated for by additions of water through valve 28 when no steam from an external source is added as described below.

Another method for stripping fat solutions which may be employed is to preheat the fat solution which is fed to the stripper in heater 14 ordinarily to a higher degree than necessary in the above described operation, and to admit live steam directly into the bottom of stripper 15 through valve 18. In this case more water is normally condensed above blank pan 16 than is required for circulation through the cycle, the excess being brought about by the introduction of the live steam. This excess may be removed as water from the system via valve 27, thereby preventing progressive dilution of the $K_3PO_4$ solution. While in the system as described both the scrubber and stripper each form a simple structural unit comprising several sections, it is possible to divide each unit into separate columns without departing from the spirit of the present invention. For simplicity, heat exchangers, by-passes, valves, pressure regulating equipment, pumps and other auxiliaries, the proper placement of which is at once evident to one skilled in the art, have been omitted.

As may be seen from the foregoing the essence of my invention comprises prescrubbing a fluid, i. e. gas or liquid containing $H_2S$, $CO_2$, etc. with water at elevated pressures, and then stripping the resulting acidulated water with steam arising from refluxing a fat alkaline absorbent (which resulted from the scrubbing of the water prescrubbed fluid with a lean absorbent solution) at reduced pressure. By this method of operation it is possible to reduce the over-all steam consumption for a given degree of removal of acidic impurities, or conversely with a given amount of steam it is possible to reduce the residual acidic impurity content of the treated fluid.

It is preferable to operate my process under pressure in excess of 100 lb./sq. in. because of the enhanced solubility of $H_2O$, $CO_2$, etc. in the water at higher pressures. However, it is possible to realize the advantages of my process at lower pressures, though usually to a lesser degree. The upper pressure limitation is dictated primarily by the economics involved in any particular situation, in general equipment built for very high pressures not being economical except wherein for example it is desired to treat a gas directly from a so-called distillate well or from special processes such as destructive hydrogenation wherein the fluid is supplied at extremely high pressures, say of the order of 2000 to 4000 lb./sq. in. A practical limitation, therefore, is usually in the neighborhood of 2000 lb./sq. in. A preferred pressure range for ordinary operation is from 200 to 1000 lb./sq. in.

Stripping the fat solution and the acidulated water should be carried out at pressures below the scrubbing pressure. This pressure may be above or below atmospheric. Generally it is convenient to carry out the stripping at atmospheric pressure, although sometimes it is more desirable to strip at subatmospheric pressures where the economics of the situation justify vacuum operation. The greater the pressure differential between scrubbing and stripping in general the more complete the removal of the impurities.

The lower the stripping pressure the more completely can the water be stripped of impurities.

In general, the lower the temperature the more soluble are the impurities in the water for a given pressure. Therefore it is usually preferable to carry out the prescrubbing at atmospheric temperature or lower, although in special instances it may be desirable to prescrub at higher temperatures.

The amount of acidic impurities removed by the prescrubbing operation can be controlled by varying the flow rates and the pressures for any given liquid to be extracted with a given flow of water. Generally speaking, the degree and economy of the pre-removal of acidic impurities by water is a function of the pressure, for higher pressures the economics being generally in favor of a more complete pre-removal.

I claim as my invention:

1. A process for removing an acid gas of the type normally found in natural gas, petroleum fractions and coke oven gas, from a substantially water immiscible fluid comprising: scrubbing the flowing fluid with non-alkaline water at an elevated pressure between about 200 and 1000 pounds per square inch under conditions to extract a portion of said acid gas by said water to form acidulated water and a first residual fluid; separating said acidulated water and said first residual fluid; scrubbing the latter with a lean solution of a base, selected from the group consisting of organic hydroxy amino bases and salts of inorganic strong bases and relatively weak acids of low volatility, under conditions to extract a further portion of said acid gas by said base solution to form a fat solution and a second residual fluid; separating said fat solution from said fluid; refluxing the separated fat solution with steam at a pressure substantially lower than said elevated pressure under conditions to produce a vapor comprising said acid gas and steam, and a residual lean base solution which is used in another cycle for scrubbing further quantities of first residual fluid; and stripping the acidulated water with said vapor under conditions such that substantially all of said acid gas is vaporized and substantially all of said steam is condensed to produce stripped water substantially free from said acid gas.

2. The process of claim 1, wherein stripped water is recirculated to scrub further quantities of fluid.

3. The process of claim 1, wherein said stripping is carried out at substantially atmospheric pressure.

4. The process of claim 1, wherein said lean solution is cooled prior to scrubbing said first residual fluid.

5. The process of claim 1, wherein said reflux steam comprises live steam from an outside source.

6. The process of claim 1, wherein said steam is derived from said fat solution by reboiling.

7. The process of claim 1 wherein said fluid is a normally gaseous fluid.

AVA J. JOHNSON.